(12) United States Patent
Kobayashi et al.

(10) Patent No.: US 8,976,421 B2
(45) Date of Patent: Mar. 10, 2015

(54) DOCUMENT FEEDING DEVICE AND IMAGE FORMING DEVICE AND IMAGE FORMING METHOD

(75) Inventors: Ken Kobayashi, Kanagawa (JP); Takuya Ito, Kanagawa (JP); Kouta Tanaka, Kanagawa (JP); Noriyuki Obara, Kanagawa (JP); Hiroatsu Kazama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1685 days.

(21) Appl. No.: 12/103,925

(22) Filed: Apr. 16, 2008

(65) Prior Publication Data

US 2009/0073512 A1  Mar. 19, 2009

(30) Foreign Application Priority Data

Sep. 14, 2007  (JP) ................................. 2007-239173

(51) Int. Cl.
*H04N 1/04* (2006.01)
*H04N 1/00* (2006.01)
*B65H 7/20* (2006.01)

(52) U.S. Cl.
CPC ............. *H04N 1/00681* (2013.01); *B65H 7/20* (2013.01); *H04N 1/00567* (2013.01);
(Continued)

(58) Field of Classification Search
CPC .......... H04N 1/00; H04N 1/04; H04N 1/028; H04N 1/047; H04N 1/10; H04N 1/12; H04N 1/393; H04N 1/409; H04N 5/225; H04N 5/228; H04N 5/232; H04N 7/32; B65H 31/34; B65H 45/04; B65H 7/02
USPC ............. 358/498, 497, 496, 1.5, 488; 399/81, 399/12, 252, 371
See application file for complete search history.

(56) References Cited

U.S. PATENT DOCUMENTS 2,512,375 A * 6/1950 Parfentjev ........................ 426/61
5,946,527 A * 8/1999 Salgado et al. .................. 399/82
(Continued)

FOREIGN PATENT DOCUMENTS

JP         6035271      2/1994
JP      2001-350225 A  12/2001
(Continued)

OTHER PUBLICATIONS

Japanese Office Action dated Dec. 15, 2009 corresponding to Japanese Patent Application No. 2007-239173.
(Continued)

*Primary Examiner* — Negussie Worku
(74) *Attorney, Agent, or Firm* — Sughrue Mion, PLLC

(57) ABSTRACT

A document feeding device has: a document placement stand on which documents of different sizes can be placed; a conveying section separating, one-by-one, documents of a document stack placed on the document placement stand, and conveying a separated document to a discharging section; a first document width sensing unit sensing a maximum document width of the document stack placed on the document placement stand; a second document width sensing unit sensing a document width of a document separated from the document placement stand by the conveying section; and a controller that, in a case in which a mixed size document mode that permits conveying of documents of different sizes is not set, causes the conveying section to restartably interrupt conveying of the document when the maximum document width sensed by the first document width sensing unit and the document width sensed by the second document width sensing unit differ.

20 Claims, 7 Drawing Sheets

(52) U.S. Cl.
CPC ...... *H04N 1/00588* (2013.01); *H04N 1/00602* (2013.01); *H04N 1/0062* (2013.01); *H04N 1/0071* (2013.01); *H04N 1/00734* (2013.01); *H04N 1/0075* (2013.01); *H04N 1/00755* (2013.01); *H04N 1/00774* (2013.01); *H04N 1/00915* (2013.01); *B65H 2301/13* (2013.01); *B65H 2511/12* (2013.01); *B65H 2511/414* (2013.01); *B65H 2513/512* (2013.01)
USPC ............ 358/474; 358/498; 358/497; 399/371

(56) References Cited

U.S. PATENT DOCUMENTS

| | | | | |
|---|---|---|---|---|
| 6,145,834 | A * | 11/2000 | Hirota et al. | 271/225 |
| 6,151,478 | A * | 11/2000 | Katsuta et al. | 399/372 |
| 6,215,976 | B1 * | 4/2001 | Shida et al. | 399/367 |
| 6,585,258 | B1 * | 7/2003 | Hirota et al. | 271/186 |
| 6,796,559 | B2 * | 9/2004 | Hirota et al. | 271/225 |
| 7,280,131 | B2 * | 10/2007 | Yamada et al. | 347/247 |
| 8,434,751 | B2 * | 5/2013 | Sakata | 270/45 |
| 8,444,135 | B2 * | 5/2013 | Morita et al. | 271/3.17 |
| 8,559,051 | B2 * | 10/2013 | Itoh | 358/1.2 |
| 8,736,926 | B2 * | 5/2014 | Suzuki et al. | 358/498 |
| 2006/0285139 | A1 * | 12/2006 | Baunach et al. | 358/1.12 |
| 2013/0236227 | A1 * | 9/2013 | Hirako | 399/371 |

FOREIGN PATENT DOCUMENTS

| | | |
|---|---|---|
| JP | 2003-134309 A | 5/2003 |
| JP | 2004-048282 A | 2/2004 |
| JP | 2004-032545 A | 12/2004 |
| JP | 2004-356959 A | 12/2004 |
| JP | 2006-108858 A | 4/2006 |
| JP | 2006-311468 A | 11/2006 |

OTHER PUBLICATIONS

Japanese Office Action in counterpart application No. JP 2010-030114, dated Sep. 18, 2012.

* cited by examiner

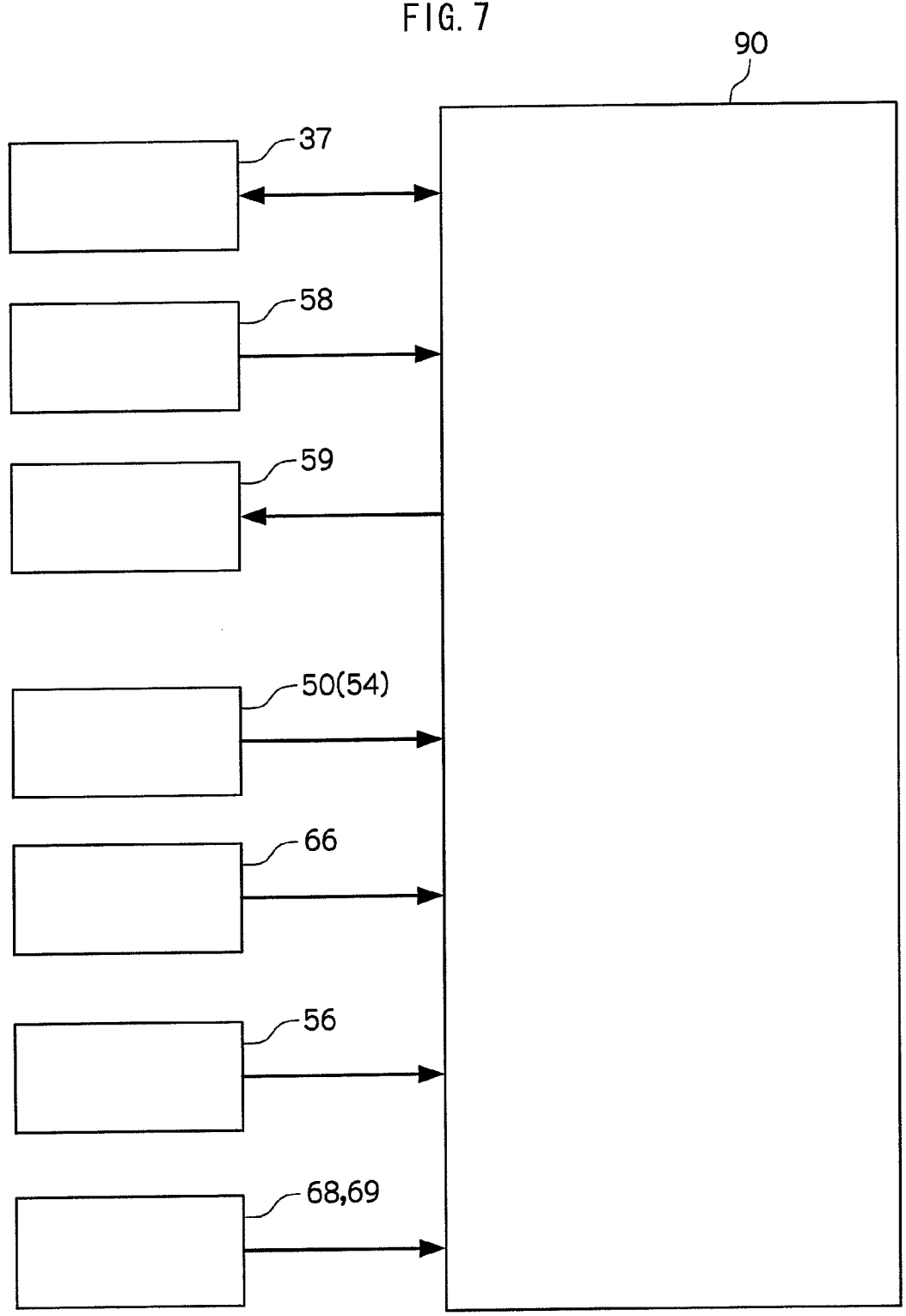

DOCUMENT FEEDING DEVICE AND IMAGE FORMING DEVICE AND IMAGE FORMING METHOD

CROSS-REFERENCE TO RELATED APPLICATION

This application is based on and claims priority under 35 USC 119 from Japanese Patent Application No. 2007-239173 filed on Sep. 14, 2007.

BACKGROUND

Technical Field

The present invention relates to a document feeding device and an image forming device.

SUMMARY

A first aspect of the present invention is a document feeding device including: a document placement stand on which documents of different sizes can be placed; a conveying section that separates, one-by-one, documents of a document stack placed on the document placement stand, and conveys a separated document to a discharging section; a first document width sensing unit that senses a maximum document width of the document stack placed on the document placement stand; a second document width sensing unit that senses a document width of a document separated from the document placement stand by the conveying section; and a controller that, in a case in which a mixed size document mode that permits conveying of documents of different sizes is not set, causes the conveying section to restartably interrupt conveying of the document when the maximum document width sensed by the first document width sensing unit and the document width sensed by the second document width sensing unit differ.

BRIEF DESCRIPTION OF THE DRAWINGS

An exemplary embodiment of the present invention will be described in detail based on the following figures, wherein:

FIG. 7 is a schematic drawing showing the relationships between a controller relating to the present exemplary embodiment and structural elements which relate to input and output to and from the controller.

DETAILED DESCRIPTION

An example of an exemplary embodiment relating to the present invention will be described hereinafter on the basis of the drawings.

Structure of Image Forming Device Relating to the Present Exemplary Embodiment

Figure 1:
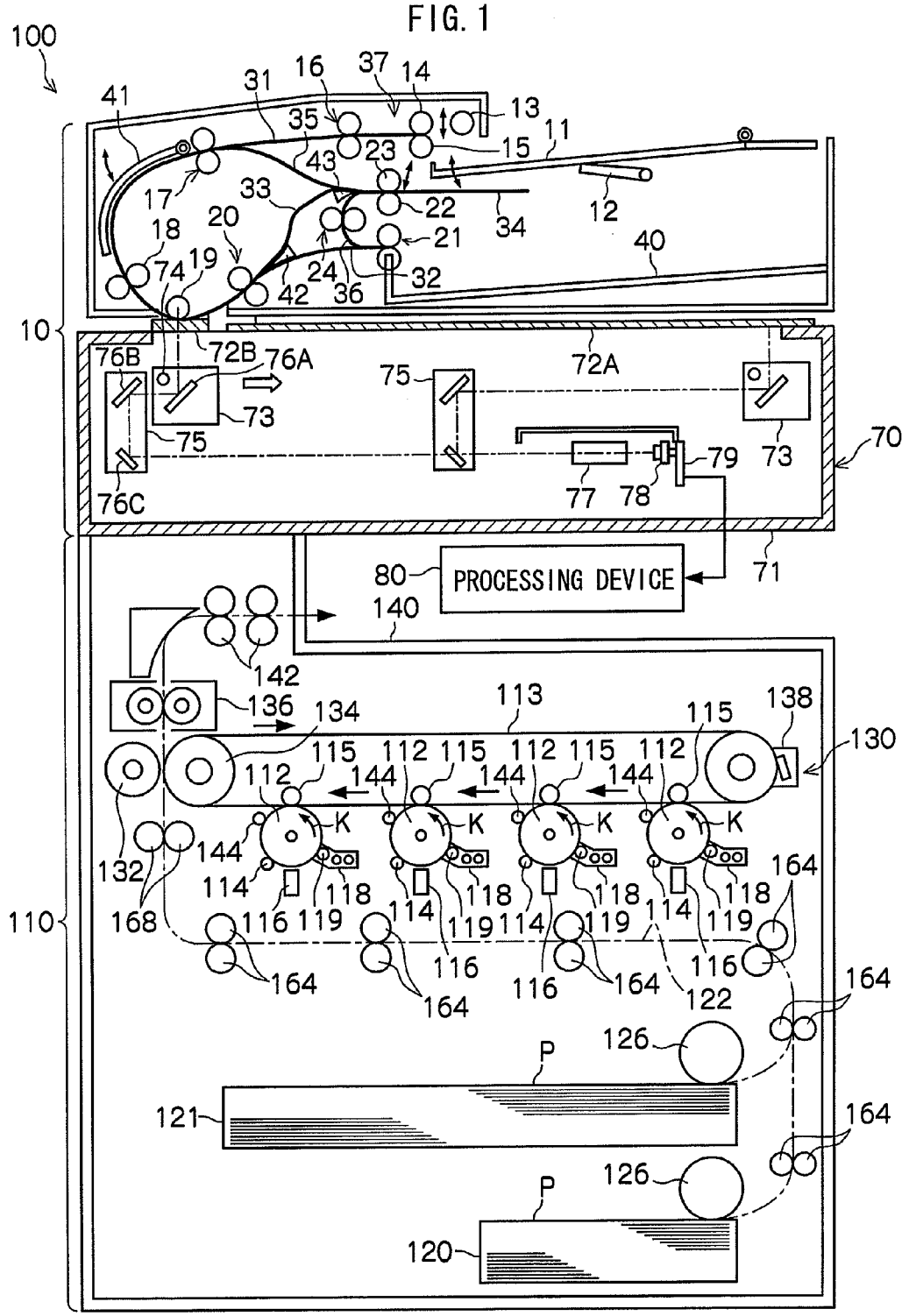
FIG. 1 is a schematic drawing showing the overall structure of an image forming device relating to an exemplary embodiment of the present invention.

First, the structure of the image forming device relating to the present exemplary embodiment will be described. FIG. 1 is a schematic drawing showing the structure of the image forming device relating to the present exemplary embodiment.

An image forming device 100 relating to the present exemplary embodiment has an image recording device 110 which records an image onto a recording medium P such as a sheet or the like, and has, as an example of a document feeding device which conveys documents, an image reading device 10 that conveys a document and reads the image on the document.

The image reading device 10 is disposed at the upper portion of the image forming device 100, and the image recording device 110 is disposed at the lower portion of the image forming device 100.

The image reading device 10 is structured so as to read the image of a document and convert the read image into an image signal. The image recording device 110 is structured so as to record an image on the recording medium P, on the basis of the image signal converted by the image reading device 10.

Here, the structure of the image recording device 110 relating to the present exemplary embodiment will be described.

As shown in FIG. 1, the image recording device 110 relating to the present exemplary embodiment has, at the lower portion thereof, plural recording media accommodating portions 120, 121 in which the recording media P are accommodated.

Recording media P of different sizes are accommodated in the recording media accommodating portions 120, 121, respectively. For example, B5-size recording media P are accommodated in the recording media accommodating portion 120, and B4-size recording media P are accommodated in the recording media accommodating portion 121.

Feed rollers 126 are disposed directly above the leading end sides (the right end sides in FIG. 1) of the recording media accommodating portions 120, 121. The feed rollers 126 rotate while contacting the leading end sides of the top surfaces of the recording media P, and feed the recording media P out from the recording media accommodating portions 120, 121.

A conveying path 122, which extends from the leading end portions of the recording media accommodating portions 120, 121, and curves in the shape of the letter S and extends toward the upper portion of the image recording device 110, is formed within the image recording device 110.

Plural (e.g., six) conveying roller pairs 164 and registration rollers 168, which nip and convey the recording medium P, are disposed along the conveying path 122 in that order from upstream side in the recording medium conveying direction.

An image recording section 130, which records an image onto the recording medium P, is disposed above the recording media accommodating portion 121.

The recording media P accommodated in the recording media accommodating portions 120, 121 are fed-out by the feed rollers 126, are conveyed on the conveying path 122 by the conveying roller pairs 164 and the registration rollers 168, and are sent to the image recording section 130.

By using respective color toners of cyan, magenta, yellow and black, the image recording section 130 forms color images onto the recording media P which are fed-in from the recording media accommodating portions 120, 121.

Four photosensitive drums 112 are disposed so as to be rotatable and so as to be lined-up in a row at the image recording section 130. The respective photosensitive drums 112 rotate in the direction of arrows K by an unillustrated driving section.

Charging rollers 114 are disposed obliquely at the bottom left of the respective photosensitive drums 112, so as to contact the photosensitive drums 112. The charging rollers 114 charge the surfaces of the photosensitive drums 112 to a predetermined electric potential.

After charging, exposure is carried out by light emitted from exposure heads 116 which are disposed beneath the respective photosensitive drums 112, such that latent images, which correspond to the image signal which the image reading device 10 converted, are formed on the surfaces of the photosensitive drums 112.

The toners of the respective colors which are charged to a predetermined polarity are held at developing rollers 119 of developing devices 118 of the respective colors. The latent images, which are formed on the surfaces of the photosensitive drums 112, are developed due to developing bias being applied to the developing rollers 119, and become toner images of the respective colors.

The toner images of the respective colors, which are formed respectively on the four photosensitive drums 112, are transferred by first transfer rollers 115 onto an intermediate transfer belt 113 disposed above the photosensitive drums 112, and are superposed on the intermediate transfer belt 113 so as to form a full-color toner image.

The recording medium P, which has been fed-out from the recording media accommodating portion 120, 121 and conveyed by the conveying roller pairs 164, is sent at a predetermined timing from the registration rollers 168 to the nip portion between a second transfer roller 132 and an intermediate transfer roller 134, and the full-color toner image is transferred onto the recording medium P. Note that the toner image is transferred onto the surface of the recording medium P which surface is at the intermediate transfer roller 134 side.

The recording medium P, on which the full-color toner image has been transferred, is sent to a fixing device 136. The fixing device 136 fixes the toner image to the recording medium P by heat and pressure. The recording medium P, to which the toner image is fixed, is discharged-out by discharging rollers 142 to a discharge tray 140.

Note that the toner images are not completely transferred to the intermediate transfer belt 113 and the recording medium P, and portions thereof remain as residual toner on the photosensitive drums 112 and the intermediate transfer belt 113. The residual toner on the photosensitive drums 112 is removed by cleaning rollers 144, and the residual toner on the intermediate transfer belt 113 is removed by a cleaning device 138.

Structure of Image Reading Device Relating to the Present Exemplary Embodiment

The structure of the image reading device relating to the present exemplary embodiment will be described next.

The image reading device 10 relating to the present exemplary embodiment has a document tray 11 which serves as an example of a document placement tray and on which documents of different sizes can be placed, and a tray lifter 12 which raises and lowers the document tray 11.

Documents of different sizes, i.e., documents at which at least one of a document length which is the distance along a document feeding direction A and a document width which is the distance along the direction orthogonal to the document feeding direction A differs, can be placed on the document tray 11.

Further, the image reading device 10 has a conveying section 37 which separates one-by-one the documents of the document stack which is placed on the document tray 11 and conveys a document to a discharge tray 40, a reading section 70 which reads the image of the document conveyed by the conveying section 37, and a processing device 80 processing the image signal read by the reading section 70.

The conveying section 37 has a feed roller 13 which feeds-out a document from the document tray 11 which has been raised up by the tray lifter 12, a feed roller 14 conveying further downstream the document fed-out by the feed roller 13, and a separating roller 15 which separates one-by-one the documents fed-out by the feed roller 13.

The conveying section 37 further has a first conveying path 31 along which the document, which is fed-out from the document tray 11, is initially conveyed. A take-away roller 16, a pre-registration roller 17, a registration roller 18, a platen roller 19, and a take-out roller 20 are provided at the first conveying path 31. The take-away roller 16 conveys the document, which singly has been separated, to the rollers at the downstream side. The pre-registration roller 17 conveys the document to rollers which are even further downstream, and forms a loop. The registration roller 18 is, after being stopped temporarily, again started to rotate in accordance with the timing, and supplies the document to the reading section 70 while carrying out registration adjustment. The platen roller 19 assists the conveying of the document during reading. The take-out roller 20 conveys the document that has been read further downstream.

A baffle 41, which rotates around a fulcrum in accordance with the state of the loop of the document being conveyed, is provided at the first conveying path 31.

A second conveying path 32 and a third conveying path 33 are provided at the downstream side of the take-out roller 20. A conveying path switching gate 42, which switches between the second conveying path 32 and the third conveying path 33, is provided at the fork between the second conveying path 32 and the third conveying path 33.

The discharge tray 40, which serves as an example of a discharging section and to which the document for which reading is finished is discharged, is provided at the downstream side of the second conveying path 32. A first discharging roller 21, which discharges the document out to the discharge tray 40, is provided at the second conveying path 32.

A fourth conveying path 34, which is for switching-back the document which has gone through the third conveying path 33, is formed at the downstream side of the third conveying path 33.

An inverting roller 22 and an inverting/pinching roller 23, which carry out switching-back of the document, are provided at the fourth conveying path 34.

A fifth conveying path 35, which guides the document switched-back by the fourth conveying path 34 to the first conveying path 31 again, communicates with the fourth conveying path 34 and the first conveying path 31.

A sixth conveying path 36, which discharges to the discharge tray 40 the document switched-back by the fourth conveying path 34, communicates with the fourth conveying path 34. A second discharging roller 24, which conveys to the first discharging roller 21 the inverted document to be discharged, and an exit switching gate 43, which switches the conveying paths of the fifth conveying path 35 and the sixth conveying path 36, are provided at the sixth conveying path 36.

In a standby state, the feed roller 13 is raised-up and is held at a withdrawn position. At the time of conveying a document, the feed roller 13 is lowered to a nipping position (document conveying position) and conveys the topmost document which is on the document tray 11.

The feed roller 13 and the feed roller 14 carry out document conveying in accordance with the connection of a feed clutch (not shown). The pre-registration roller 17 makes the leading end of the document abut the registration roller 18 which is stopped, and forms a loop. At the registration roller 18, at the time of loop formation, the leading end of the document which is bit into by the registration roller 18 is returned to the nip position. When the loop is formed, the baffle 41 opens around the fulcrum, and functions so that there is no impediment to the loop of the document.

The take-away roller 16 and the pre-registration roller 17 maintain the loop during reading. By forming the loop, adjustment of the reading timing is carried out, and further, skewing which accompanies conveying of the document at the time of reading is suppressed, and the alignment adjusting function can be improved. Rotation of the registration roller 18, which is stopped, is started in accordance with the timing of the start of reading. The document is pushed against a second platen glass 72B by the platen roller 19, and image data is read from the direction of the bottom surface.

At times when the reading of a simplex (single-sided) document ends, and at times when simultaneous reading of a duplex (double-sided) document ends, the conveying path switching gate 42 carries out switching so as to lead the document, which has gone by the take-out roller 20, to the second conveying path 32 and discharge the document out to the discharge tray 40. On the other hand, at times of successively reading a duplex document, the conveying path switching gate 42 carries out switching so as to lead the document to the third conveying path 33 in order to invert the document. At times of successively reading a duplex document, the inverting/pinching roller 23 is retracted in a state in which the feed clutch (not shown) is off such that the nip is opened, and the document is guided to the inverting path (the fourth conveying path 34). Thereafter, the inverting/pinching roller 23 forms the nip, the document which is inverted by the inverting roller 22 is guided to the pre-registration roller 17, and the inverted document which is to be discharged is conveyed to the second discharging roller 24 of the sixth conveying path 36.

The reading section 70 is provided at the lower portion of the image reading device 10, and carries out image reading of the document conveyed by the conveying section 37. A first platen glass 72A, on which a document whose image is to be read-in is placed in a stationary state, and the second platen glass 72B, in which is formed an opening for passage of light for reading a document which is being conveyed, are provided at a device frame 71 which forms the housing of the reading section 70.

The reading section 70 has a full rate carriage 73 and a half rate carriage 75. The full rate carriage 73 is stationary beneath the second platen glass 72B, and scans over the entire first platen glass 72A in order to read-in the image. The half rate carriage 75 provides the light, which is reflected at the full rate carriage 73, to a focusing portion. An illuminating lamp 74 which illuminates light onto the document, and a first mirror 76A which receives reflected light obtained from the document, are provided at the full rate carriage 73. Further, a second mirror 76B and a third mirror 76C, which provide the light reflected at the first mirror 76A to the focusing portion, are provided at the half rate carriage 75.

The reading section 70 has a lens 77 for focusing which optically reduces the optical image from the third mirror 76C, a CCD (Charge Coupled Device) image sensor 78 which photoelectrically converts the optical image focused by the lens 77 for focusing, and a driving substrate 79 at which the CCD image sensor 78 is provided. The image signal obtained by the CCD image sensor 78 is sent to the processing device 80 via the driving substrate 79. The processing device 80 is structured so as to send the image signal to the exposure heads 116.

First, in the case of reading the image of a document which is placed on the first platen glass 72A, the full rate carriage 73 and the half rate carriage 75 move in the scanning direction (the direction of the arrow) at a ratio of 2:1. At this time, the light of the illumination lamp 74 of the full rate carriage 73 is illuminated onto the surface to be read of the document, and the reflected light from the document is reflected by the first mirror 76A, the second mirror 76B and the third mirror 76C in that order, and is guided to the lens 77 for focusing. The light guided to the lens 77 for focusing is focused on the light-receiving surface of the CCD image sensor 78. The CCD image sensor 78 is a one-dimensional sensor, and simultaneously processes an amount of one line. When the reading of one line in the direction of the lines (the fast scanning direction) is finished, the full rate carriage 73 is moved in the direction (the slow scanning direction) orthogonal to the fast scanning direction, and the next line of the document is read. By carrying this out over the entire size of the document, document reading of one page is completed.

On the other hand, the second platen glass 72B is formed by, for example, a transparent glass plate which forms an elongated plate-shaped structure. The document which is conveyed by the conveying section 37 passes on the top of the second platen glass 72B. At this time, the full rate carriage 73 and the half rate carriage 75 are in a state of being stopped at the positions shown by the solid lines in FIG. 1. First, reflected light of the first line of the document which passes by the platen roller 19 of the conveying section 37, is, via the first mirror 76A, the second mirror 76B and the third mirror 76C, focused by the lens 77 for focusing, and the image is read-in by the CCD image sensor 78. Namely, one line in the fast scanning direction is processed simultaneously by the CCD image sensor 78 which is a one-dimensional sensor, and, thereafter, the next one line in the fast scanning direction of the document conveyed by the conveying section 37 is read-in. Reading of one page over the slow scanning direction is completed by the trailing end of the document passing the reading position of the second platen glass 72B after the leading end of the document reaches the reading position of the second platen glass 72.

In the image reading device 10 relating to the present exemplary embodiment, center registration is employed in which the document is conveyed by using, as a reference, the central position (the central position in the fast scanning direction at the document) in the direction (the fast scanning direction) orthogonal to the document feeding direction A, and the conveyed document is read. A deep side guide 61 and a forward side guide 62, which serve as examples of document guides which guide the document and which centrally distribute the document at the time of realizing this center registration, are provided at the document placement surface of the document tray 11.

The deep side guide 61 and the forward side guide 62 are structured so as to be able to move in the direction (the depthwise direction, the transverse direction of the document) orthogonal to the document feeding direction A, by sliding grooves 65 which are formed in the document tray 11.

Further, the deep side guide 61 and the forward side guide 62 position the document by abutting the transverse direction end portions of the document and the transverse direction end portions of the document being arranged properly thereat.

The deep side guide 61 and the forward side guide 62 are respectively connected to racks 63 which are provided at the reverse side of the document placement surface of the document tray 11 (i.e., at the inner side of the document tray 11). The rack 63 extending from the deep side guide 61 and the rack 63 extending from the forward side guide 62 are connected to a pinion 64. By the racks 63 and the pinion 64, the deep side guide 61 and the forward side guide 62 are slid interlockingly with the sliding operation of one of the guides, and the amounts by which the both slide are controlled to be equal. If the deep side guide 61 and the forward side guide 62 are disposed at positions which are equal from the center (the central position) in the depthwise direction (i.e., if the deep side guide 61 and the forward side guide 62 are distributed with the center as the reference), the center (central position) of the depthwise direction length formed by the deep side guide 61 and the forward side guide 62 is maintained even after the guides slide.

Figure 3:
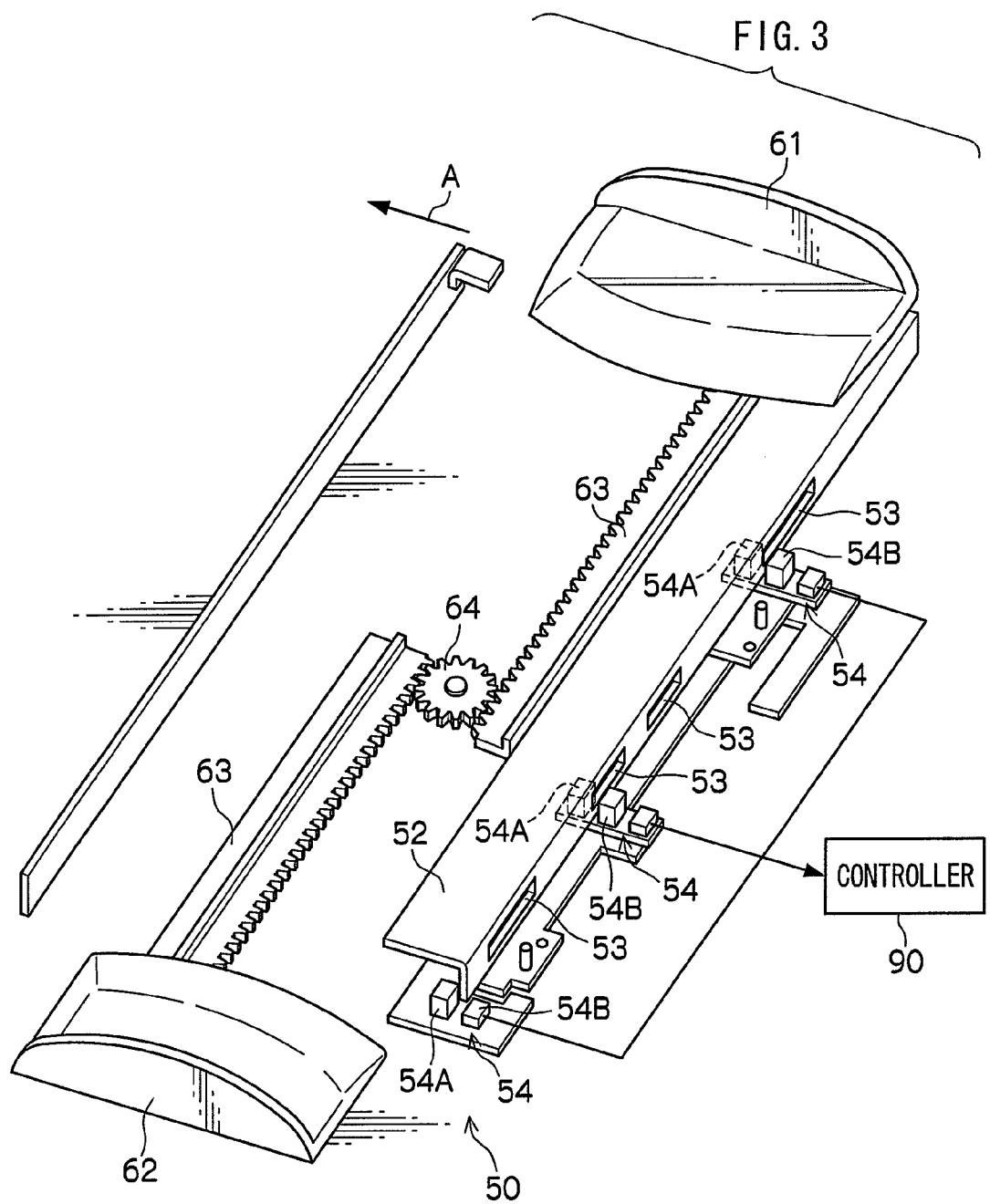
FIG. 3 is a schematic drawing showing the structures of a deep side guide and a forward side guide and the structure of a first document width sensor, relating to the present exemplary embodiment.

As shown in FIG. 3, the image reading device 10 has a first document width sensor 50 which serves as an example of a first document width sensing unit which senses a maximum document width of the stack of documents placed on the document tray 11. Note that the document tray 11 is omitted from illustration in FIG. 3.

The first document width sensor 50 has a moving body 52 which moves integrally with the deep side guide 61 accompanying the sliding movement of the deep side guide 61.

The moving body 52 is formed by a plate bent in the shape of the letter L in cross-section, and is structured integrally with the rack 63 of the deep side guide 61. Plural openings 53 are formed in the moving body 52 along the moving direction of the moving body.

The first document width sensor 50 has plural light sensors 54 which are disposed along the moving body 52. The moving body 52 in which the openings 53 are formed moves between light-emitting portions 54A and light-receiving portions 54B of the light sensors 54. When the openings 53 are positioned between the light-emitting portions 54A and the light-receiving portions 54B, the light-receiving portions 54B receive the light illuminated from the light-emitting portions 54A of the light sensors 54. If the openings 53 are not positioned between the light-emitting portions 54A and the light-receiving portions 54B, the light-receiving portions 54B do not receive the light illuminated from the light-emitting portions 54A of the light sensors 54.

In this way, the document width of the stack of documents placed on the document tray 11 is sensed from the positions of the openings 53 of the moving body 52 which moves accompanying the deep side guide 61. The document width of the stack of documents placed on the document tray 11 is sensed by using, as the reference, the position of the deep side guide 61.

Here, if documents of different document widths are placed on the document tray 11, the deep side guide 61 and the forward side guide 62 abut the end portions of the document of the maximum width among the documents of the different document widths, and position this document. Therefore, the document width of the document sensed from the position of the deep side guide 61 is the maximum document width of the stack of documents placed on the document tray 11.

Note that, in the present exemplary embodiment, three of the light sensors 54 are provided, and eight document widths can be sensed.

Further, the first document width sensing unit that senses the maximum document width of the stack of documents placed on the document tray 11 may be a document width sensor that, on the basis of the amount of rotation of the pinion 64, recognizes the positions of the deep side guide 61 and the forward side guide 62 and senses the document width of the document positioned by the deep side guide 61 and the forward side guide 62.

The first document width sensing unit may be structured so as to sense the maximum document width of the stack of documents placed on the document tray 11 by directly sensing, by reflecting-type sensors or the like, the document width of the document positioned by the deep side guide 61 and the forward side guide 62.

Figure 2:
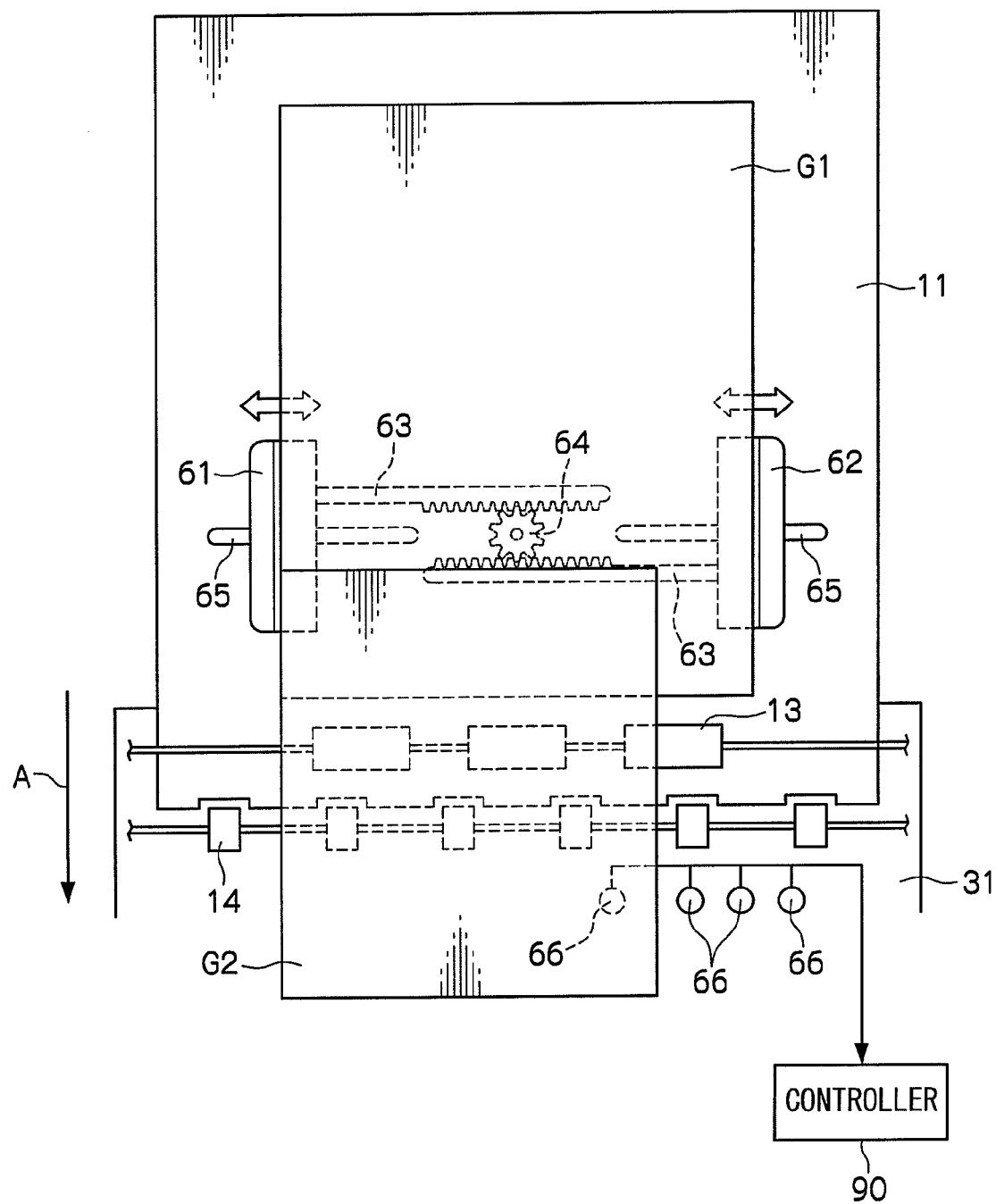
FIG. 2 is a schematic drawing showing the structures of a document tray and second document width sensors relating to the present exemplary embodiment.

In the present exemplary embodiment, as shown in FIG. 2, second document width sensors 66, which serve as an example of a second document width sensing unit which senses the document width of the document which has been separated singly from the document tray 11 by the conveying section 37, are provided in a vicinity of the downstream side of the feed roller 14 at the first conveying path 31.

Reflecting-type sensors for example are used as the second document width sensors 66. When placing the second document width sensors 66, the intervals therebetween are determined by taking into consideration the sensing of anticipated document widths (A/B sizes such as A4 vertical, A4 horizontal, A5 horizontal, B4 horizontal, B5 vertical and the like, as well as sizes in inches, and the like).

The second document width sensors 66 may be structured such that, for example, B5 size is sensed when the one sensor at the innermost side is on, A4 size is sensed when two sensors closest to the inner most side are on, B4 size is sensed when three sensors closest to the inner most side are on, and A3 size is sensed when four sensors closest to the inner most side are on.

Note that, in the example shown in FIG. 3, the second document width sensors 66 are provided at the forward side guide 62 side, on the basis of the assumption that the stack of documents is placed so as to be properly aligned at the deep sides and the feeding direction leading end sides of the documents properly aligned. However, the second document width sensors 66 may be disposed so as to be able to carry out sensing also in cases in which the stack of documents is placed so as to be properly aligned at the forward side or at the central portion in the transverse direction.

Figure 4:
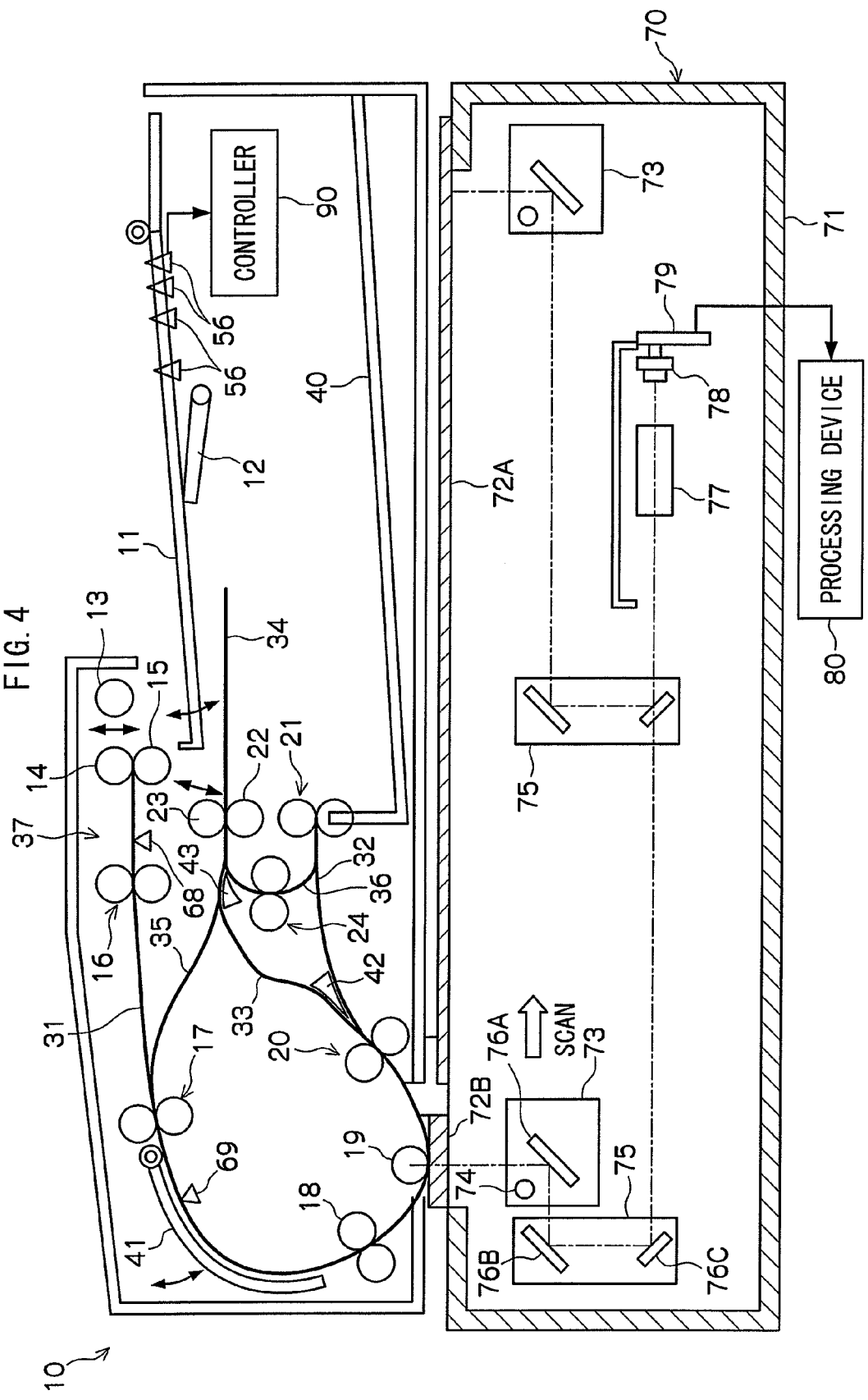
FIG. 4 is a schematic drawing showing the structure of an image reading device and the structures of first document length sensors and second document length sensors, relating to the present exemplary embodiment.

In the present exemplary embodiment, as shown in FIG. 4, first document length sensors 56, which serve as an example of a first document length sensing unit which senses the maximum document length of the stack of documents placed on the document tray 11, are provided at the document tray 11.

Reflecting-type sensors for example are used as the first document length sensors 56. When placing the first document length sensors 56, the intervals therebetween are determined by taking into consideration the sensing of anticipated document lengths (A/B sizes such as A4 vertical, A4 horizontal, A5 horizontal, B4 horizontal, B5 vertical and the like, as well as sizes in inches, and the like).

The first document length sensors 56 may be structured such that, for example, B5 size is sensed when the one sensor which is positioned furthest toward the conveying direction side is on, A4 size is sensed when two sensors are on, B4 size is sensed when three sensors are on, and A3 size is sensed when four sensors are on.

Second document length sensors 68, 69, which serve as an example of a second document length sensing unit which senses the document length of the document which singly has been separated from the document tray 11 by the conveying section 37, are provided at the conveying path 31.

Reflecting-type sensors for example are used as the second document length sensors 68, 69. When placing the second document length sensors 68, 69, the interval therebetween is determined by taking into consideration the sensing of anticipated document lengths (A/B sizes such as A4 vertical, A4 horizontal, A5 horizontal, B4 horizontal, B5 vertical and the like, as well as sizes in inches, and the like).

The second document length sensor 69 senses the leading end of the document, and the document length of the document is sensed in accordance with whether or not the second document length sensor 68 senses the document at this time.

Note that the second document length sensors 68, 69 may be structured such that the second document length sensor 69 senses the leading end of the document, the second document length sensor 68 senses the trailing end of the document, and the length of the document is sensed on the basis of the time from the time the leading end of the document is sensed to the time when the trailing end of the document is sensed, and the distance between the second document length sensor 68 and the second document length sensor 69, and the conveying speed.

A controller 90 is connected to the first document width sensor 50, the second document width sensors 66, the first document length sensors 56, and the second document length sensors 68, 69. The sensing signals of the first document width sensor 50, the second document width sensors 66, the first document length sensors 56, and the second document length sensors 68, 69, i.e., the document width information and document length information of the document, are sent to the controller 90 (refer to FIG. 7).

The controller 90 controls the driving of the conveying section 37. The operations of the various types of rollers, the switching operations of the gates, and the like are controlled by the controller 90.

Figure 5:
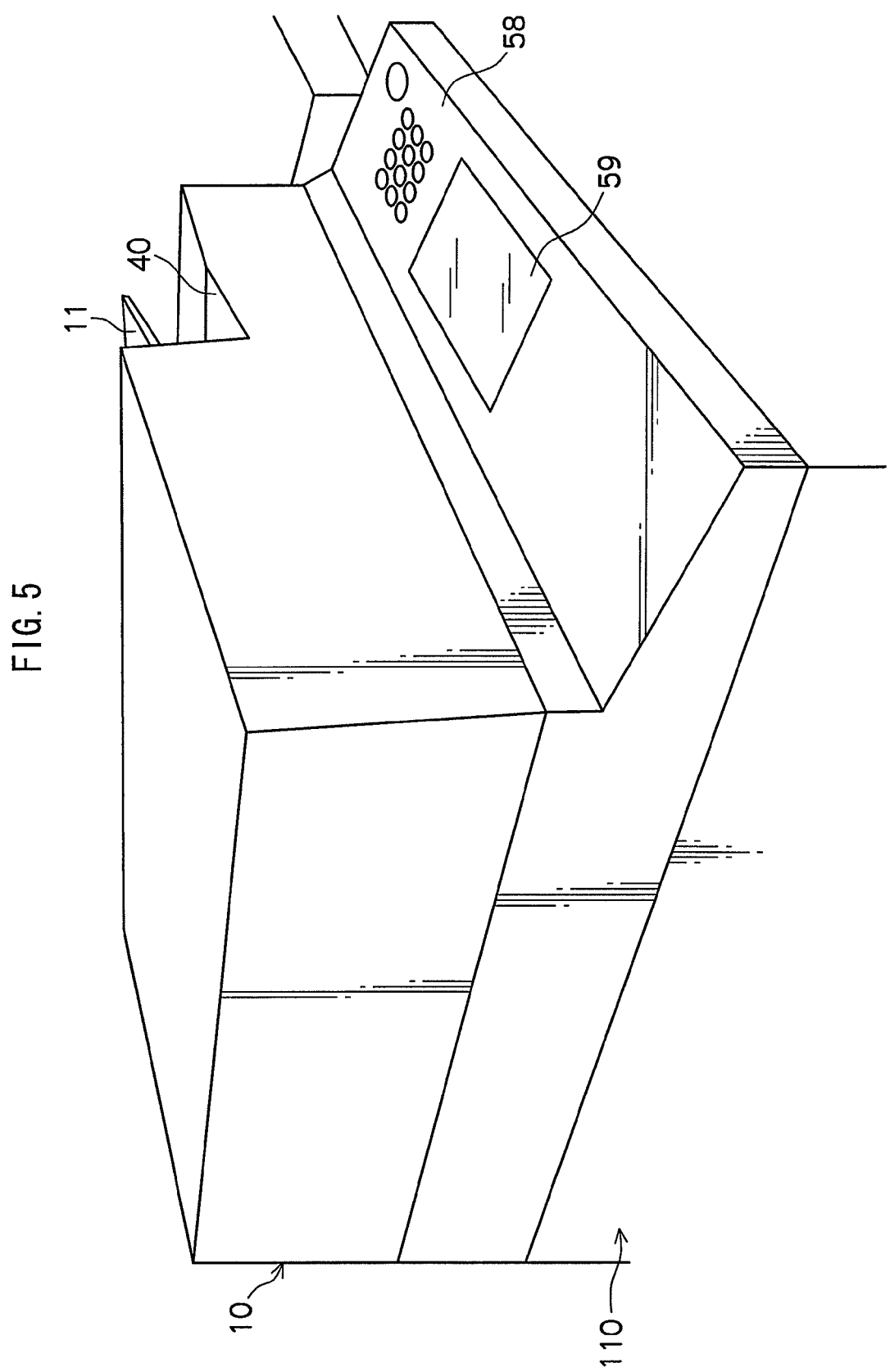
FIG. 5 is a perspective view showing the exterior of the image reading device relating to the present exemplary embodiment.

Further, as shown in FIG. 5, an operation panel 58, which serves as an example of an operation section that can be operated by an operator, is provided at the surface of the housing of the image reading device 10. The operation panel 58 has a display panel 59 which serves as an example of a display section on which information to be notified to the operator is displayed.

The image reading device 10 relating to the present exemplary embodiment has a mixed size document mode which permits the conveying of documents of different sizes, and a regular mode (single document mode) which does not permit the conveying of documents of different sizes. In the regular mode, the conveying of only documents of the same size is permitted.

In the present exemplary embodiment, in the mixed size document mode, documents of different sizes are stacked together and placed on the document tray 11 at the same time, documents of different sizes are successively conveyed from this stack of documents, and the images of the documents are read.

The mixed size document mode is set by the operator selecting it through the operation panel 58. When the mixed size document mode is selected, the controller 90 carries out mixed size document mode processing.

In the mixed size document mode, the size of each conveyed document is sensed one-by-one by the second document width sensors 66 and the second document length sensors 68, 69, and the image of the document is read.

The document width information and document length information of this document are sent to the image recording device 110 via the controller 90. For example, the image of a B5-size document is copied onto a B5-size recording medium P, and the image of a B4-size document is copied onto a B4-size recording medium P.

Note that, in the present exemplary embodiment, the operator is instructed to, at the time of placing the stack of documents, properly arrange and stack the documents at the deep sides and at the feeding direction leading end sides of the documents, so that the documents of the different sizes are placed at the document tray 11 in a state of being arranged properly at the deep side guide 61 and the pull-in direction leading end side.

In the regular mode, on the basis of the assumption that all of the document sizes are the same, the size of the documents is sensed by the first document width sensor 50 and the second document width sensors 66, and the images of the documents are read.

In a case in which the mode is not the mixed size document mode (i.e., in a case in which the mode is the regular mode in the present exemplary embodiment), if the maximum document width sensed by the first document width sensor 50 and the document width sensed by the second document width sensors 66 are different, the controller 90 restartably interrupts conveying of the document by the conveying section 37.

Further, in a case in which the mode is not the mixed size document mode (i.e., in a case in which the mode is the regular mode in the present exemplary embodiment), if the maximum document length sensed by the first document length sensors 56 and the document length sensed by the second document length sensors 68, 69 are different, the controller 90 restartably interrupts conveying of the document by the conveying section 37.

When an interruption command is sent from the controller 90 to the conveying section 37, the conveying section 37 at least causes the document to stand-by at a standby position which is before the reading position of the reading section 70.

Further, the controller 90 judges either that there is a reading possible state in which it is possible for the reading section 70 to read the image of the document for which conveying is interrupted, or that there is a reading impossible state in which it is not possible for the reading section 70 to read the image of the document for which conveying is interrupted.

If the document is stopped before the reading position of the reading section 70, reading of the image of the document is possible. Therefore, for the reading possible state, for example, it may be sensed whether or not the document for which conveying is interrupted is stopped at the standby position which is before the reading position of the reading section 70, and, if the document for which conveying is interrupted is stopped at the standby position, it may be judged that there is a reading possible state.

Further, if the document is stopped at the downstream side of the reading position of the reading section 70, reading of the image of the document is not possible. Therefore, for the reading impossible state, for example, it may be judged that there is a reading impossible state if the document for which conveying is interrupted is stopped downstream of the standby position which is before the reading position of the reading section 70.

Further, for the reading impossible state, in cases in which copying cannot be carried out due to circumstances at the image recording device 110, such as in cases at the image recording device 110 in which the recording medium P has already been conveyed and it is difficult to form an image on that recording medium P, or the like, there is no sense in reading the image of the document. Therefore, the controller 90 may judge that there is a reading impossible state.

Note that, even in cases in which the document for which conveying is interrupted is stopped downstream of the standby position, a state in which reading of the document is possible may be brought about by, by using the third conveying path 33 and the fourth conveying path 34, inverting and conveying the document so as to return the document to the upstream side of the reading position. Or, the reading possible state may be brought about by conveying the document reversely.

The reading possible state and the reading impossible state can be set arbitrarily, and various structures therefor are possible.

In a case in which conveying of the document is interrupted in the reading possible state, the controller 90 displays, on the display panel 59 of the operation panel 58, that it is possible to change to the mixed size document mode. The operator can change to the mixed size document mode by operating the operation panel 58.

If the operator changes to the mixed size document mode, the display panel 59 automatically and successively displays the procedures for setting the mixed size document mode. In these setting procedures, the operator can set the print sizes for documents of different sizes, or can set a reduction/enlargement magnification, or the like.

If the operator does not change to the mixed size document mode, the display panel 59 displays that the document guides should be made to match the document widths of the documents.

In a case in which conveying of the document is interrupted in the reading impossible state, the display panel 59 displays the reason why reading of the image by the reading section 70 cannot be restarted, and a confirm button. When the confirm button is pushed, the conveying section 37 discharges out to the discharge tray 40 the document for which conveying is interrupted.

Operation of Present Exemplary Embodiment

Operation of the above-described exemplary embodiment will be described next.

The operator of the image forming device 100 places a stack of documents on the document tray 11. At this time, the operator sets the stack of documents such that the documents of the different sizes are arranged properly at the deep side guide 61 and at the pull-out direction leading end side, and sets the deep side guide 61 and the forward side guide 62 at the stack of documents.

Next, based on the position of the deep side guide 61, the first document width sensor 50 senses the maximum document width of the stack of documents placed at the document tray 11. The sensing signal sensed by the first document width sensor 50, i.e., the maximum document width information of the stack of documents, is sent to the controller 90. In a case in which the mode is the regular mode and not the mixed size document mode, all of the documents match this width.

Further, the first document length sensors 56 sense the maximum document length of the stack of documents placed in the document tray 11. The sensing signal sensed by the first document length sensors 56, i.e., the maximum document length information of the stack of documents, is sent to the controller 90. In a case in which the mode is the regular mode and not the mixed size document mode, all of the documents match this length.

Here, a case is assumed in which the operator forgets to select the mixed size document mode, and presses the reading start button. Due to this operation, reading of the documents is started.

Next, the second document width sensors 66 sense the document width of the document which is singly separated and conveyed. The sensing signal sensed by the second document width sensors 66, i.e., the document width information of the document, is sent to the controller 90. The second document length sensors 68, 69 sense the document length of the document which is separated and conveyed. The sensing signal sensed by the second document length sensors 68, 69, i.e., the document length information of the document, is sent to the controller 90.

Then, the controller 90 judges whether or not the sensing signal of the first document width sensor 50 (the document width information) and the sensing signal of the second document width sensors 66 (the document width information) differ, and judges whether or not the sensing signal of the first document length sensors 56 (the document length information) and the sensing signal of the second document length sensors 68, 69 (the document length information) differ. If the sensing signal of the first document width sensor 50 (the document width information) and the sensing signal of the second document width sensors 66 (the document width information) do not differ and the sensing signal of the first document length sensors 56 (the document length information) and the sensing signal of the second document length sensors 68, 69 (the document length information) do not differ, i.e., if the respective sensing signals match one another, conveying of the document by the conveying section 37 continues as is, and the image of the conveyed document is read by the reading section 70.

If the sensing signal of the first document width sensor 50 (the document width information) and the sensing signal of the second document width sensors 66 (the document width information) differ, or if the sensing signal of the first document length sensors 56 (the document length information) and the sensing signal of the second document length sensors 68, 69 (the document length information) differ, the document is made to stand-by at the standby position, and conveying of the document by the conveying section 37 is interrupted so as to be able to be restarted.

Note that, in the example shown in FIG. 2, the document maximum width of a document stack G1 placed on the document tray 11, and the document width of a document G2 which is separated and conveyed singly, differ. Namely, if a document of the same width as the document stack G1 is separated and conveyed, three sensors of the second document width sensors 66 are on, and the sensing signal of the first document width sensor 50 (the document width information) and the sensing signal of the second document width sensors 66 (the document width information) coincides. However, because the document width of the document which is separated and conveyed is more narrow than the document guide width, only one sensor is on, and the sensing signal of the first document width sensor 50 and the sensing signal of the second document width sensors 66 differ.

The controller 90 displays, on the display panel 59, buttons for selecting whether or not the mixed size document mode is to be set.

In this example, the documents are mixed size documents in which documents of different sizes are mixed together, and therefore, the operator pushes the mixed size document button.

Next, the controller 90 moves on to the mixed size document mode, while successively displaying the setting procedures of the mixed size document mode on the display panel 59. Because the operator can grasp the flow to the mixed size mode while setting the parameters and the like, he/she can learn the setting procedures for times hereinafter.

When the move to the mixed size document mode is completed, the controller 90 causes the conveying section 37 to restart conveying, and reading of the document is started.

Here, if the documents placed on the document tray 11 are not mixed size documents, the operator presses the regular mode button and the regular mode is selected.

In this case, the controller 90 causes the conveying section 37 to convey the document for which conveying is interrupted, and to discharge the document out to the discharge tray 40.

Figure 6:
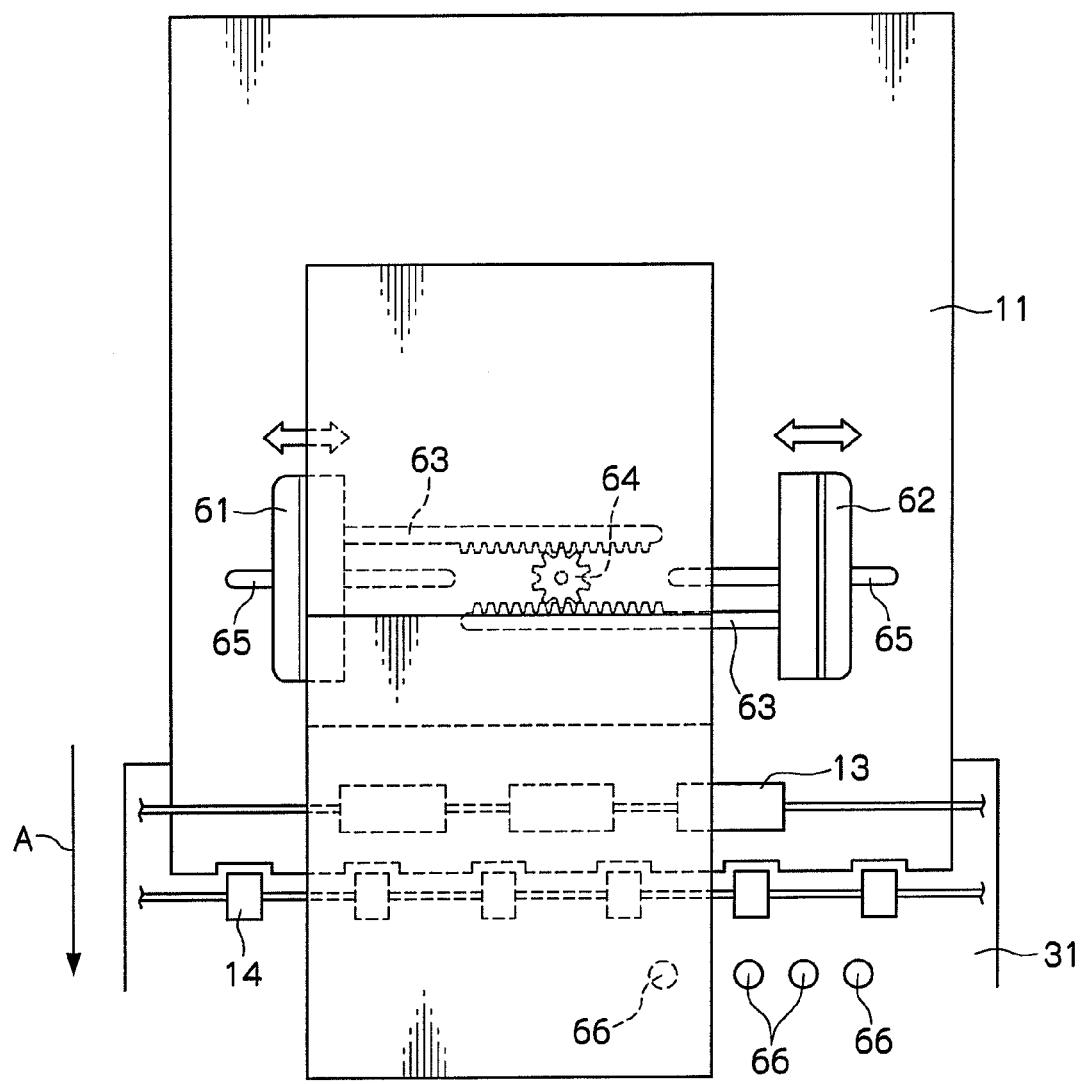
FIG. 6 is a schematic drawing for explaining a case in which the document widths of documents, which are placed in the document tray relating to the present exemplary embodiment, and of a document, which is separated and conveyed, coincide with one another.

Further, in this case, due to the operator not setting the stack of documents correctly at the deep side guide 61 and the forward side guide 62 as shown in FIG. 6, the sensing signal of the first document width sensor 50 (the document width information) and the sensing signal of the second document width sensors 66 (the document width information) differ. Therefore, a message notifying the operator to correctly set the deep side guide 61 and the forward side guide 62, and a confirm button, are displayed on the display panel 59.

Here, the operator presses the confirm button. The operator re-sets the deep side guide 61 and the forward side guide 62, and reading is done again. At this time, because the document for which conveying is interrupted is discharged out to the discharge tray 40, the document does not stop at the conveying section 37. As a result, there is no need to fix a paper jam.

A case is described above in which the non-matching of sizes is sensed before the start of reading of the first document of a stack of documents. However, even for the second document or documents thereafter, if such sensing is carried out before the start of reading, conveying of the document can be restarted and the image of that document can be read.

The present invention is not limited to the above-described exemplary embodiment, and various modifications, changes and improvements are possible.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document feeding device comprising:
   a document placement stand on which documents of different sizes can be placed;
   a conveying section that separates, one-by-one, documents of a document stack placed on the document placement stand, and conveys a separated document to a discharging section;
   a first document width sensing unit that senses a maximum document width of the document stack placed on the document placement stand;
   a second document width sensing unit that senses a document width of a document separated from the document placement stand by the conveying section;
   a reading section that reads an image of the document conveyed by the conveying section; and
   a controller that, in a case in which a mixed size document mode that permits conveying of documents of different sizes is set, causes the conveying section to convey the document to the discharging section after the reading section reads an image regardless of whether or not the maximum document width sensed by the first document width sensing unit and the document width sensed by the second document width sensing unit are the same or are different, and in a case in which a mixed size document mode that permits conveying of documents of different sizes is not set, causes the conveying section to restartably interrupt conveying of the document when the maximum document width sensed by the first document width sensing unit and the document width sensed by the second document width sensing unit differ.

2. The document feeding device of claim 1, further comprising a reading section that reads an image of a document conveyed by the conveying section,
   wherein the controller judges whether there is a reading possible state in which reading, by the reading section, of an image of the document for which conveying is interrupted is possible, or a reading impossible state in which reading, by the reading section, of the image of the document for which conveying is interrupted is not possible.

3. The document feeding device of claim 2, further comprising an operating section by which an operator can change to the mixed size document mode in a case in which conveying of the document is interrupted in the reading possible state.

4. The document feeding device of claim 2, wherein, in a case in which conveying of the document is interrupted in the reading impossible state, the conveying section discharges the document for which conveying is interrupted to the discharging section.

5. The document feeding device of claim 1, further comprising a display section that automatically and successively displays setting procedures of the mixed size document mode in a case in which the document feeding device is changed to the mixed size document mode.

6. The document feeding device of claim 5, wherein, in a case in which the first document width sensing unit senses the maximum document width of the documents from a position of a document guide that arranges transverse direction end portions of the documents, and the document feeding device is not changed to the mixed size document mode, the display section displays that the document guide should be made to match the document widths of the documents.

7. The document feeding device of claim 1, wherein the conveying section causes the document to stand-by at an upstream side of a reading position of a reading section.

8. The document feeding device of claim 7, wherein, in a case in which the document for which conveying is interrupted is stopped at a downstream side of the reading position, the conveying section conveys the document so as to return the document to the upstream side of the reading position.

9. The document feeding device of claim 1, wherein the conveying section causes the document to stand-by between a document width sensing position of the second document width sensing unit and a reading position of the reading section.

10. A document feeding device comprising:
a document placement stand on which documents of different sizes can be placed;
a conveying section that separates, one-by-one, documents of a document stack placed on the document placement stand, and conveys a separated document to a discharging section;
a first document length sensing unit that senses a maximum document length of the document stack placed on the document placement stand; and
a second document length sensing unit that senses a document length of a document separated from the document placement stand by the conveying section; and
a controller that, in a case in which the mixed size document mode that permits conveying of documents of different sizes is not set, causes the conveying section to restartably interrupt conveying of the document when the maximum document length sensed by the first document length sensing unit and the document length sensed by the second document length sensing unit differ.

11. An image forming device comprising:
a document feeding device that includes
a document placement stand on which documents of different sizes can be placed,
a conveying section that separates, one-by-one, documents of a document stack placed on the document placement stand, and conveys a separated document to a discharging section,
a first document width sensing unit that senses a maximum document width of the document stack placed on the document placement stand,
a second document width sensing unit that senses a document width of a document separated from the document placement stand by the conveying section, and
a controller that, in a case in which a mixed size document mode that permits conveying of documents of different sizes is not set, causes the conveying section to restartably interrupt conveying of the document when the maximum document width sensed by the first document width sensing unit and the document width sensed by the second document width sensing unit differ; and
an image recording device that records an image onto a recording medium on the basis of an image that is read at a reading section of the document feeding device.

12. An image forming method comprising:
feeding a document that includes,
placing a document on a document placement stand on which documents of different sizes can be placed,
separating, one-by-one, documents of a document stack placed on the document placement stand, and conveying a separated document to a discharging section,
sensing a first document width that is a maximum document width of the document stack placed on the document placement stand,
sensing a second document width that is a width of a document separated from the document placement stand by the conveying section, and
controlling, in a case in which a mixed size document mode that permits conveying of documents of different sizes is not set, the conveying section to restartably interrupt conveying of the document when the maximum document width sensed by the first document width sensing unit and the document width sensed by the second document width sensing unit differ; and
recording an image onto a recording medium on the basis of an image that is read at a reading section of the document feeding device.

13. A document feeding device having different document conveying modes including a mixed size document mode, that permits conveying of documents from a document stack of different sizes, and a single document mode, that permits only conveying of documents from a document stack of a single size is possible, the document feeding device comprising:
a document placement stand on which documents of different sizes can be placed;
a conveying section that separates, one-by-one, documents of a document stack placed on the document placement stand, and conveys a separated document to a reading section that reads an image of the document;
a first document width sensing unit that senses a maximum document width of the document stack placed on the document placement stand;
a second document width sensing unit that senses a document width of a document separated from the document placement stand by the conveying section;
a controller that controls conveying operation of the document by the conveying section; and
an operation section that sets the document conveying mode,
wherein, in a case in which the document conveying mode is the single document conveying mode, when the controller judges a difference between the maximum document width sensed by the first document width sensing unit and the document width sensed by the second document width sensing unit, the controller controls the conveying section to interrupt conveying of the document, and, when conveying of the document is being interrupted, the controller controls the conveying section to restart conveying of the document on the basis of an operation at the operation section of switching the document conveying mode to the mixed size document mode.

14. The document feeding device of claim 13, further comprising:
a first document length sensing unit that senses a maximum document length of the document stack placed on the document placement stand; and
a second document length sensing unit that senses a document length of the document separated from the document placement stand by the conveying section,
wherein, in the single document mode, when the maximum document length sensed by the first document length sensing unit and the document length sensed by the second document length sensing unit differ, the controller controls the conveying section to interrupt conveying of the document.

15. The document feeding device of claim 13, wherein, for the document for which conveying is interrupted, the controller judges whether there is a reading possible state in which reading, by the reading section, of an image of the document is possible, or a reading impossible state in which reading, by the reading section, of the image is not possible.

16. The document feeding device of claim 15, further comprising a discharging section to which a document after image reading is discharged, and, when the controller judges that there is a reading impossible state for the document for which conveying is interrupted, the controller controls the conveying section to discharge the document to the discharging section.

17. The document feeding device of claim 15, wherein the controller permits switching of the document conveying mode to the mixed size document mode only when the controller judges that there is the reading possible state for the document for which conveying is interrupted.

18. The document feeding device of claim 13, further comprising a display section displaying setting procedures of the mixed size document mode when switching of the document conveying mode to the mixed size document mode is permitted.

19. The document feeding device of claim 18, wherein the first document width sensing unit includes a document guide which properly arranges transverse direction end portions of the documents, and, when the operation of switching to the mixed size document mode is not carried out in the single document mode for the document for which conveying is interrupted, the display section displays that the document guide should be made to match the document widths of the documents.

20. An image forming device comprising:
- a document feeding device having different document conveying modes including a mixed size document mode, that permits conveying of documents from a document stack of different sizes, and a single document mode, that permits only conveying of documents from a document stack of a single size is possible, the document feeding device comprising,
- a document placement stand on which documents of different sizes can be placed;
- a conveying section that separates, one-by-one, documents of a document stack placed on the document placement stand, and conveys a separated document to a reading section that reads an image of the document;
- a first document width sensing unit that senses a maximum document width of the document stack placed on the document placement stand;
- a second document width sensing unit that senses a document width of a document separated from the document placement stand by the conveying section;
- a controller that controls conveying operation of the document by the conveying section; and
- an operation section that sets the document conveying mode,
- wherein, in a case in which the document conveying mode is the single document conveying mode, when the controller judges a difference between the maximum document width sensed by the first document width sensing unit and the document width sensed by the second document width sensing unit, the controller controls the conveying section to interrupt conveying of the document, and, when conveying of the document is being interrupted, the controller controls the conveying section to restart conveying of the document on the basis of an operation at the operation section of switching the document conveying mode to the mixed size document mode.

* * * * *